United States Patent
DeMeritt et al.

(10) Patent No.: US 6,215,942 B1
(45) Date of Patent: Apr. 10, 2001

(54) GANGED BOXES FOR HOLDING OPTICAL COMPONENTS

(75) Inventors: Jeffery A. DeMeritt, Painted Post; Cynthia A. Kubissa, Elmira; Todd M. Wetherill, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/441,984

(22) Filed: Nov. 17, 1999

Related U.S. Application Data

(60) Provisional application No. 60/116,182, filed on Jan. 14, 1999.

(51) Int. Cl.[7] .................................................... G02B 6/00
(52) U.S. Cl. ............................ 385/136; 385/134; 385/135
(58) Field of Search ................................... 385/134, 135, 385/136

(56) References Cited

U.S. PATENT DOCUMENTS

| | | | |
|---|---|---|---|
| 5,438,641 | 8/1995 | Malacarne | 385/137 |
| 5,509,099 | * 4/1996 | Hermsen et al. | 385/134 |
| 5,572,617 | 11/1996 | Bernhardt et al. | 385/135 |
| 5,668,909 | 9/1997 | Mozzati | 385/134 |
| 5,787,219 | 7/1998 | Mueller et al. | 385/134 |
| 5,835,658 | 11/1998 | Smith | 385/136 |

* cited by examiner

Primary Examiner—Rodney Bovernick
Assistant Examiner—Ellen E. Kim
(74) Attorney, Agent, or Firm—Eric M. Smith

(57) ABSTRACT

A box for holding optical components comprising a base having an upper surface for receiving a layer of optical components, the base being attachable into a fiber-optic device. A clamping bar attached to the base over the layer of optical components, such that the layer of optical components is held in place, with the optical fiber leads of the optical components extending outside of opposite ends of the box for splicing.

2 Claims, 10 Drawing Sheets

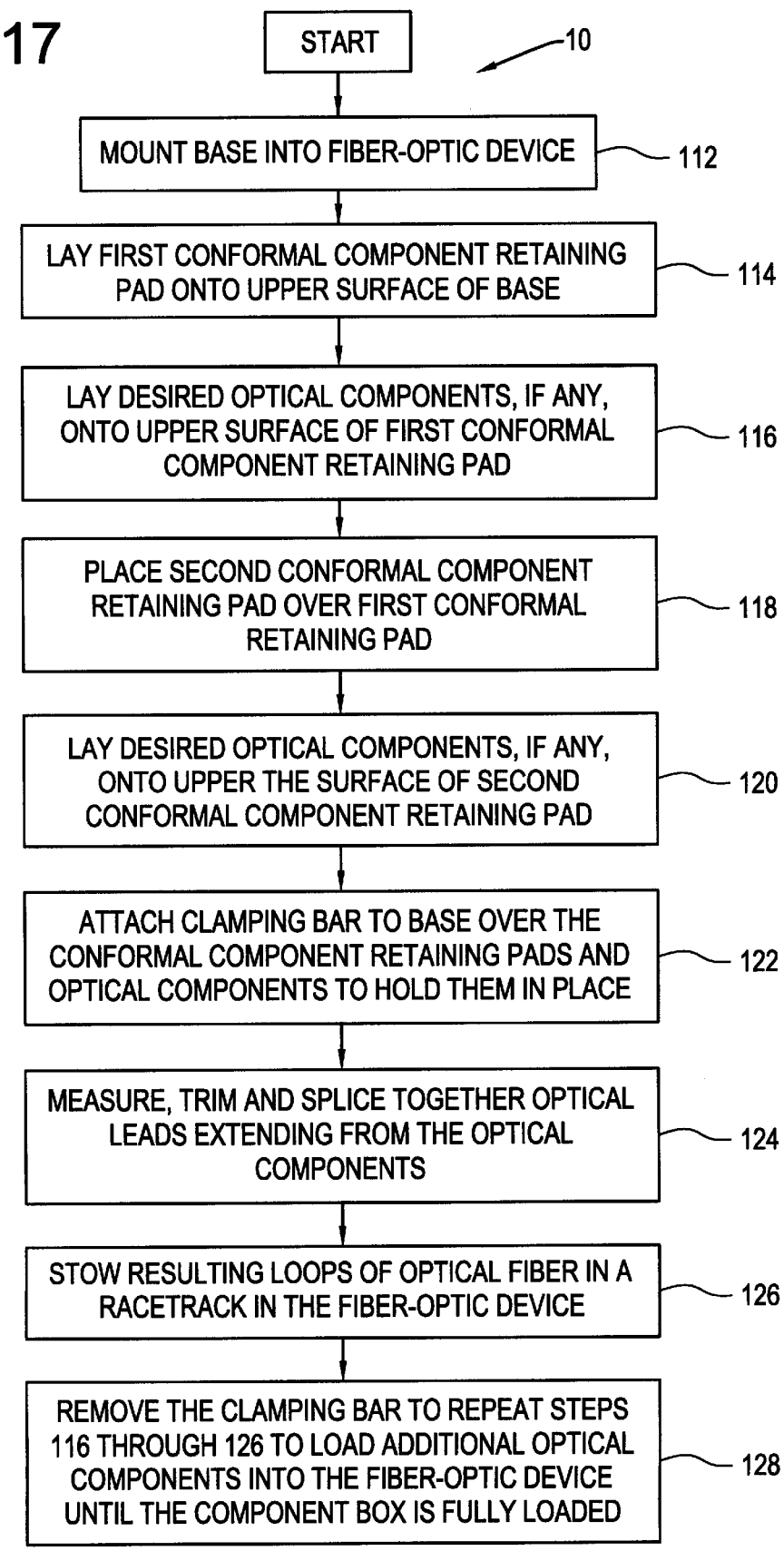

GANGED BOXES FOR HOLDING OPTICAL COMPONENTS

CLAIM PRIORITY

This application claims the benefit of priority under 35 U.S.C. § 120 of Provisional U.S. Patent Application Serial No. 60/116182 filed on Jan. 14, 1999, the content of which is relied upon and incorporated herein by reference in its entirety.

FIELD OF THE INVENTION

The present invention relates generally to improvements to the field of optical components, and more particularly to aspects of systems and methods for holding optical components in position in a device.

TECHNICAL BACKGROUND

There are currently being manufactured and developed a number of devices and systems for use in fiber-optic networks. These devices and systems include optical amplifiers that provide direct amplification of fiber-optic signals without the need to convert the light signal into an electrical signal. These fiber-optic devices and systems typically include a number of optical components having fiber leads that must be spliced together. The optical fiber leads are easily damaged. Structures have been developed for mounting the optical components into the fiber-optic devices and for stowing the spliced leads out of harm's way.

One disadvantage of currently used optical component mounting structures is that they require a relatively large amount of space within the fiber-optic device. This is increasingly problematic as the trend in fiber-optic devices is towards smaller packages. Thus there is a need for a system for mounting optical components within a fiber-optic device that protects the optical components while efficiently using the space available.

SUMMARY OF THE INVENTION

This and other disadvantages of the prior art are addressed by the present invention. A first embodiment of the invention provides a box for holding optical components, including, a base having surface for receiving multiple optical components, the base being attachable into a fiber-optic device. A clamping bar is attached to the base over the optical components, such that the optical components are held in place by friction between the clamping bar and the base, with optical fiber leads from the optical components extending outside of opposite ends of the box for splicing. A further embodiment of the invention provides a method for holding optical components in a fiber-optic device. The method includes the steps of laying down optical components onto a base having a surface for receiving the optical components and attaching a clamping bar over the layer of optical components, such that the optical components are held in place by friction between the clamping bar and the base, with optical fiber leads from the optical components extending beyond opposite ends of the base for splicing.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

BRIEF DESCRIPTION OF THE DRAWINGS

FIG. 17 is a flowchart of a first embodiment of a method according to the present invention for holding optical components in a fiber-optic device.

DETAILED DESCRIPTION

The present invention now will be described more fully with reference to the accompanying drawings, in which currently preferred embodiments of the invention are shown. However, the described invention may be embodied in various forms and should not be construed as limited to the exemplary embodiments set forth herein. Rather, these representative embodiments are described in detail so that this disclosure will be thorough and complete, and will fully convey the structure, operation, functionality and potential scope of applicability of the invention to those skilled in the art.

Figure 2:
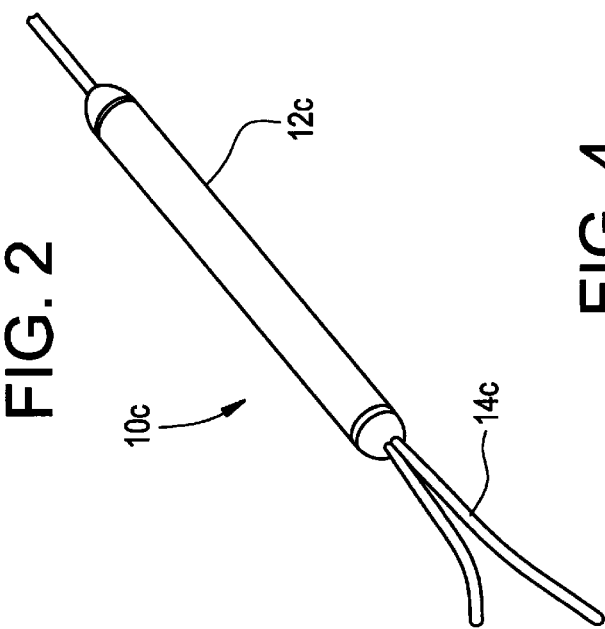
FIGS. 1 through 4 are perspective views of typical optical components used in fiber-optic devices.
Figure 1:
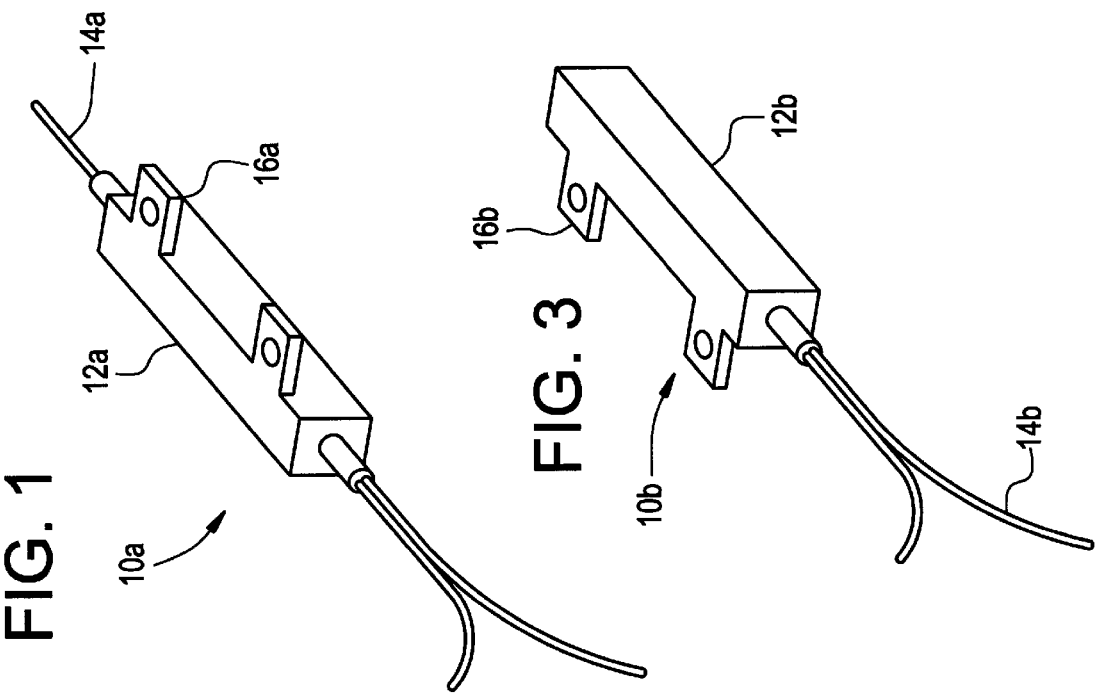

FIGS. 1 through 4 are perspective views of a number of optical components 10a–d that are currently used in the construction of fiber-optic devices, such as optical amplifiers. These optical components typically include a body or package 12a–d and fiber optic leads 14a–d extending out of the body. Certain optical components, such as those shown in FIGS. 1 and 2, are manufactured with rectangular packages 12a–b. Typical dimensions of these packages are typically on the order of a few millimeters or tens of millimeters. For example exemplary packages depicted in these figures may have dimensions of approximately, 5.6 mm×5.6×38 mm and 6.4 mm×6.4 mm×38 mm. As shown in FIGS. 1 and 2, the rectangular optical components have rectangular tabs 16a, 16b projecting outward from the bodies of the components. These tabs 16a., 16b have holes 17 for receiving plastic snap rivets that are used in mounting the component to a printed circuit board or other supporting structure.

Figure 4:
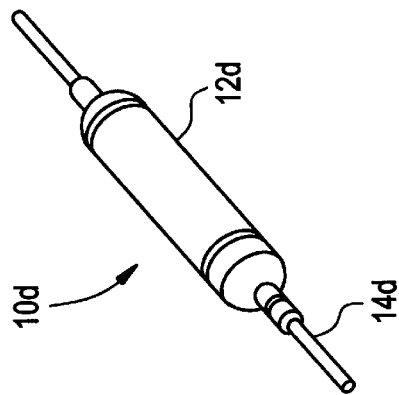
Figure 3:
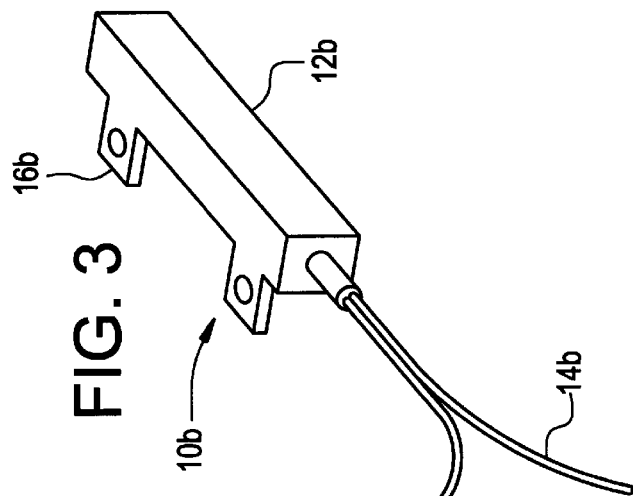
Figure 5:
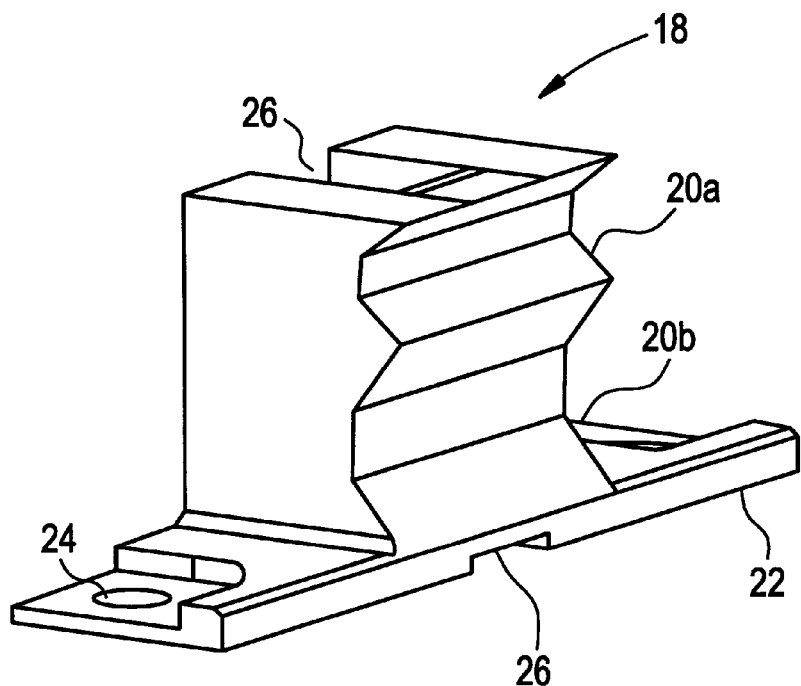
FIG. 5 is a perspective view of an optical component holder.

Other optical components, such as those shown in FIGS. 3 and 4, have cylindrical packages 12c, 12d. Typically dimensions for commonly used cylindrical packages are on the order of a few millimeters in diameter by a few tens of millimeters in length. The illustrated example may have typical respective diameters of 3.5 mm and 5.5 mm and lengths of 30 mm and 53–54 mm. The body 12a–d of an optical component 10a–d is typically mounted onto a printed circuit board or other supporting structure, and the fiber-optic leads are then spliced to other fiber-optic leads 14a–d, as required. FIG. 5 shows a perspective view of a component holder 18 that is used to mount a pair of cylindrical optical components 10c, 10d, into a device. The component holder 18 is typically made of a glass filled polymer, or an other suitable material. Exemplary of a glass filled polymer is Ultem 2300 made by General Electric Corp. used because its coefficient of thermal expansion is close to that of optical fiber, and is moldable, machinable and stiff, as well as having other useful properties.

As shown in FIG. 5, the component holder 18 includes an upper V-shaped groove 20a and lower V-shaped groove, 20b that are shaped to receive cylindrical optical components 10c, 10d. The upper groove 20a is shaped to receive a cylindrical optical component 10c with a smaller diameter lower groove 20b is shaped to receive a cylindrical optical component 10d with a larger diameter. The component holder 18 further includes a flat base 22 having a pair of holes 24 for receiving snap rivets to mount the component holder 18 onto a printed circuit board or other supporting structure. In addition, the component holder 18 has a slot 26 for receiving a cable tie 28, or spring clip (not shown).

Figure 6:
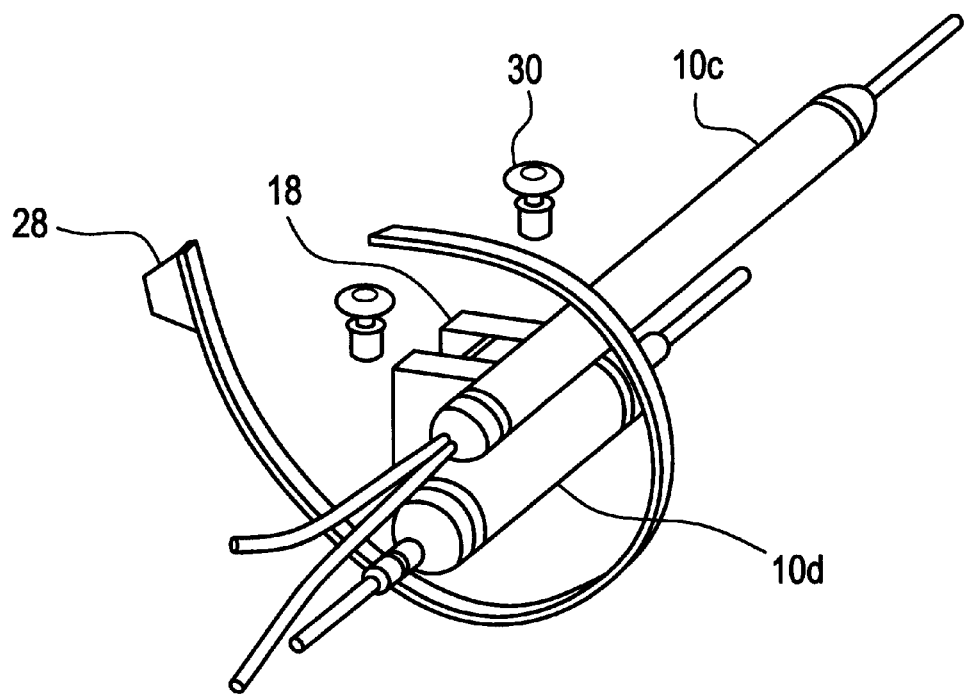
FIG. 6 is an exploded perspective view of the optical component holder of FIG. 5, including optical components and attachment devices.

FIG. 6 shows a perspective view of the component holder 18 shown in FIG. 5, with optical components 10c, 10d placed into the upper and lower V-shaped grooves 20a, 20b. A cable tie 28 is fastened around the component holder 18 and the optical components 10c, 10d. Plastic snap rivets 30 are then used to mount the loaded component holder 18 onto a printed circuit board 76 or other supporting structure.

Figure 7:
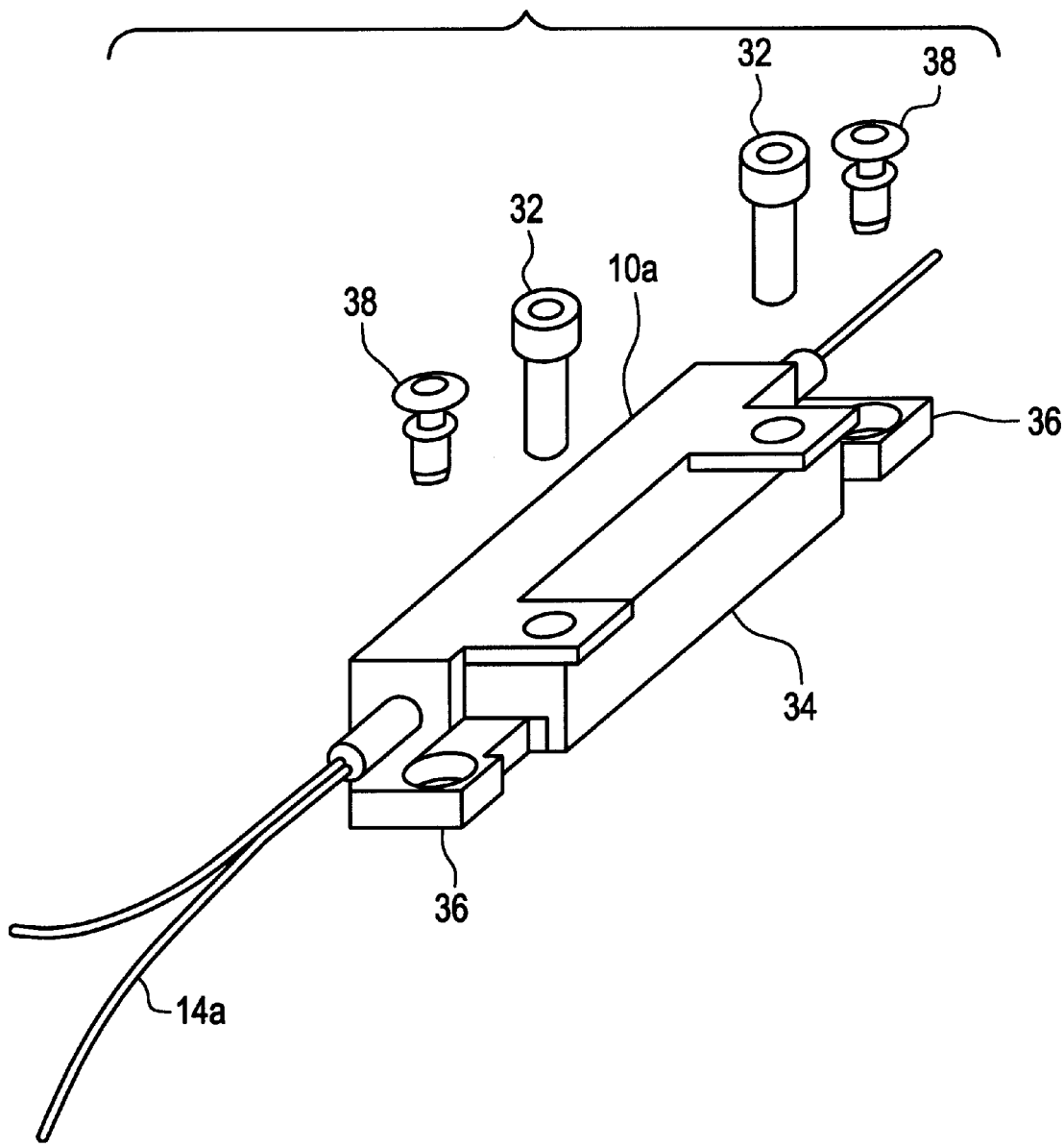
FIG. 7 is an exploded perspective view of a second optical component holder including an optical component and attachment devices.

FIG. 7 shows a perspective view of the structures used to mount the rectangular optical component 10a, onto a printed circuit board 76 or other supporting structure. Plastic snap rivets 32 are used to mount optical component 10a onto a rectangular component holder 34. Tabs 36 at the base of the rectangular component holder 34 are provided for mounting the component holder 34 to a motherboard (not shown). These tabs 36 are provided with holes 37 for receiving plastic snap rivets 38.

The use of fiber-optic leads is problematic. Splicing optical fiber leads is a precise task, sometimes requiring several attempts. Optical components, therefore, are typically provided with relatively long leads. This allows unsuccessful splices to be broken out and the leads to be trimmed back until a successful splice is achieved. Fiber-optic leads are also easily damaged; thus, structures have been developed to protect the long loops of fiber that may results after the splicing of fiber-optic leads.

Figure 8:
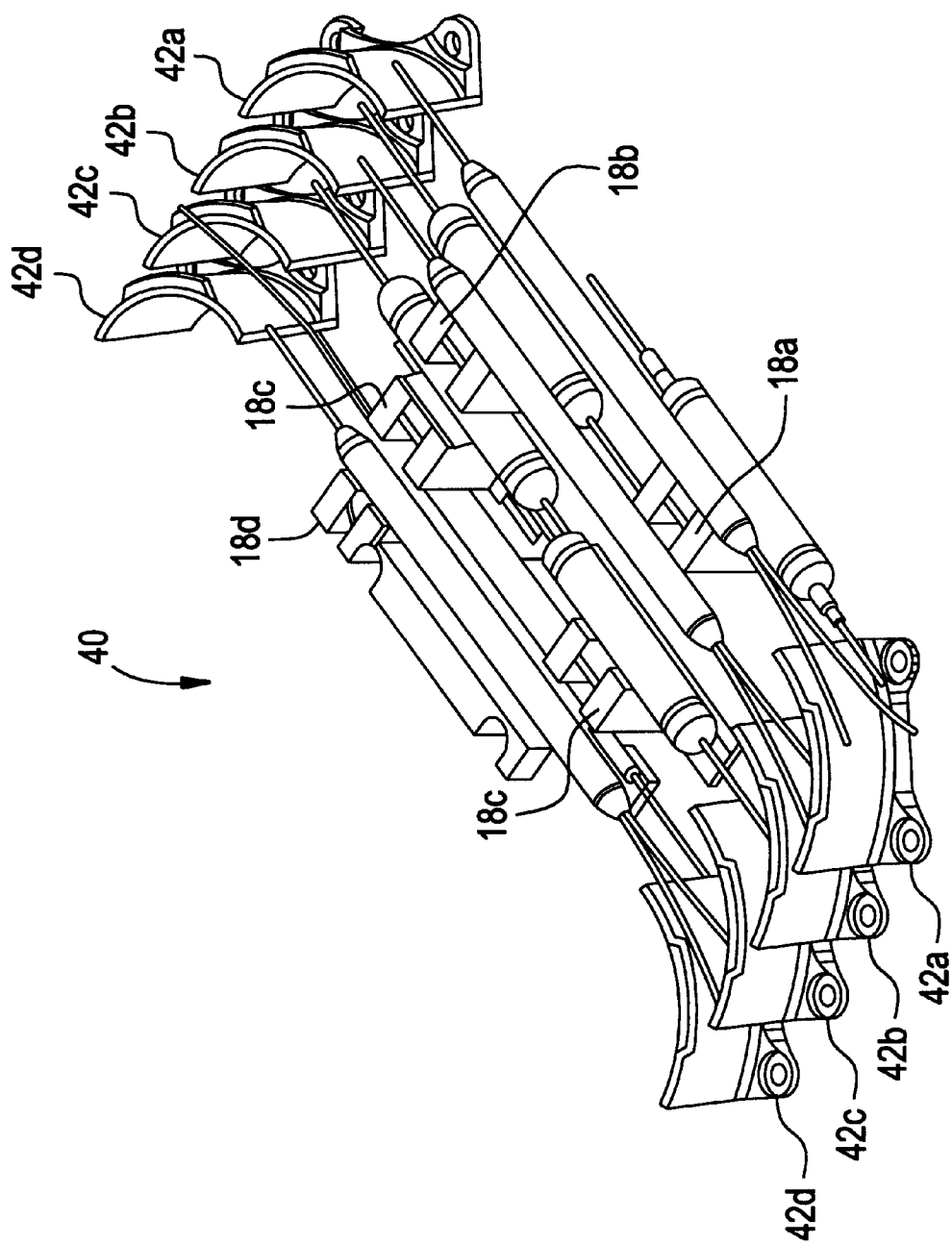
FIG. 8 is a perspective view of a bank of four optical component bays

FIG. 8 shows a perspective view of four optical component "bays" 40. Each of the bays 40 includes a pair of curved fiber guides 42, and at least one component holders 18 located between the fiber guides 42. Optical components 10 may be attached to the component holders 18, as described above, by seating them in receiving upper and lower V-shaped grooves 20a, 20b and fixing them into place using cable ties.

The optical component holders 18 and fiber guides 42 are aligned such that the fiber optic leads 14 exiting from the optical components 10 run tangent to the fiber guides 42. The fiber guides 42 are used to guide the optical fiber leads 14 safely to central coil elements (not shown), where the optical fiber leads 14 are spliced to optical fiber leads 14 from other components.

One benefit of the bay method of holding optical components is that it offers versatility. A variety of combinations of optical components may be held in a typical bay. The use of bays, although advantageous in many respects, also requires a relatively large amount of space. This relatively inefficient is of space is required to allow for the holders, and access for tools for attachment to a base and for adjusting the optical components, etc.

Figure 9:
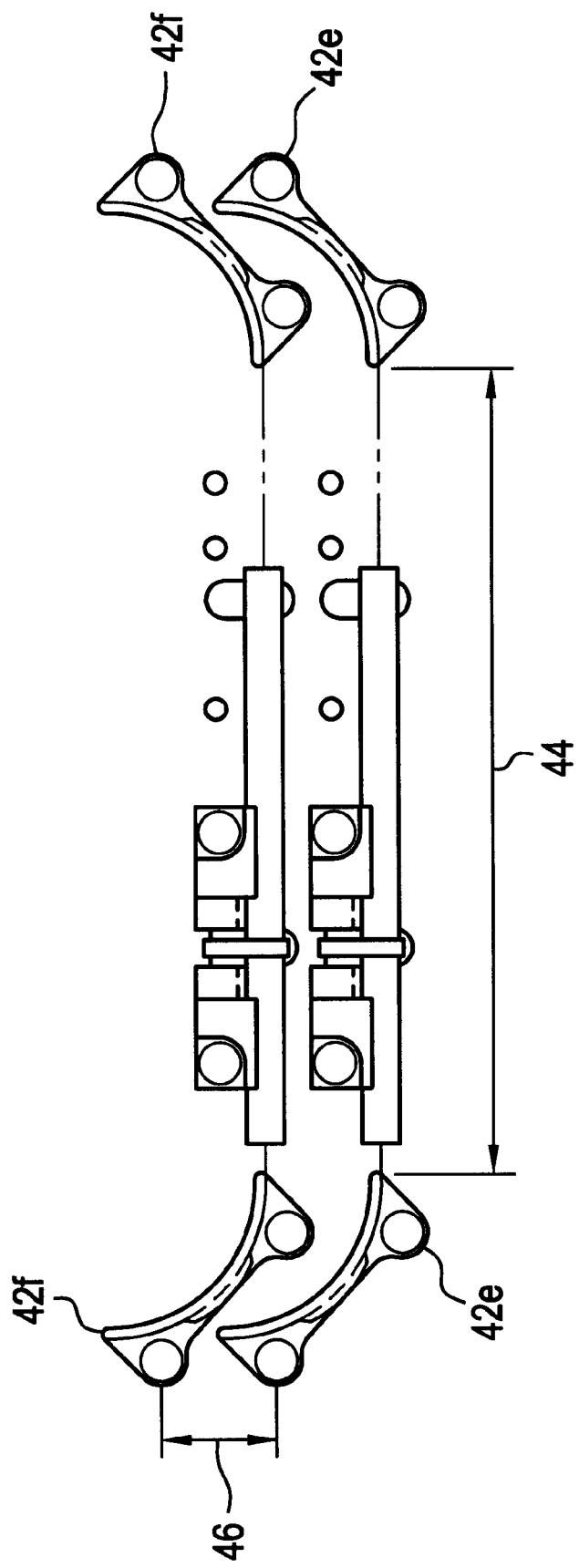
FIG. 9 is a top view of two optical component bays.

The spacing requirements are illustrated in FIG. 9, which shows a top view of two adjacent bays. The depicted system requires that each pair of fiber guides 42 be separated from each other by a distance, illustrated by double arrow 44. This distance is typically on the order of 80.86 mm. Further, adjacent bays must be separated from each other by a distance, illustrated by double arrow 46, which typically is about 11.43 mm. Thus, each bay of the type illustrated in FIG. 9 requires approximately 924 mm$^2$ of "floor space" on the printed circuit board or other supporting structure. This amount of floor space accommodates one to four optical components 10, depending upon the height of the module. For example, one currently used module has a height of approximately 12 mm with two-high component stacking. Another currently used module has a height of approximately 25 mm, which can handle four-high component stacking.

Thus, in a module with a height of 19 mm, to hold ten optical components would require four bays and use approximately 3,697 mm$^2$ of floor space on a printed circuit board or other supporting structure. In some newer modules, this area would consume approximately one-third of the overall available space.

Due to the increasing complexity of optical devices and spatial limitations, there is a need for loading more and more optical components into an optical device of a given volume. In order to use the available space more efficiently, a "ganging" arrangement has been developed.

Figure 10:
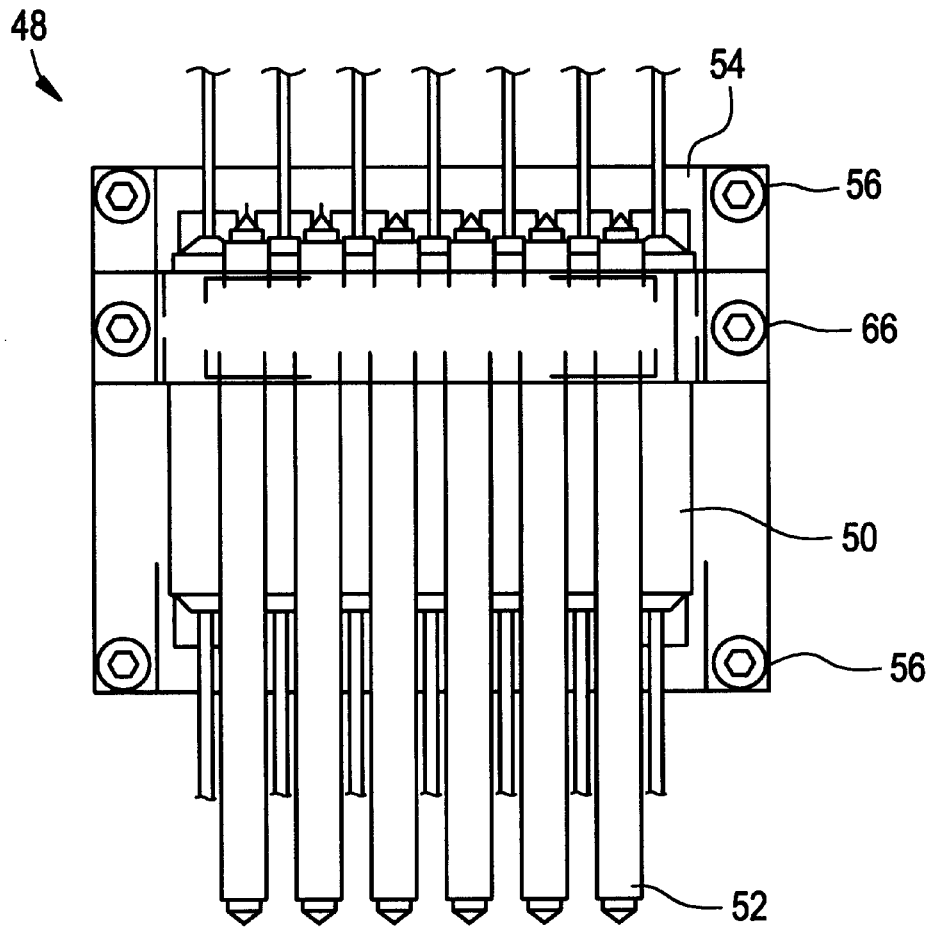
FIG. 10 is a top view of a first embodiment of a ganged component box according to the present invention.
Figure 11:
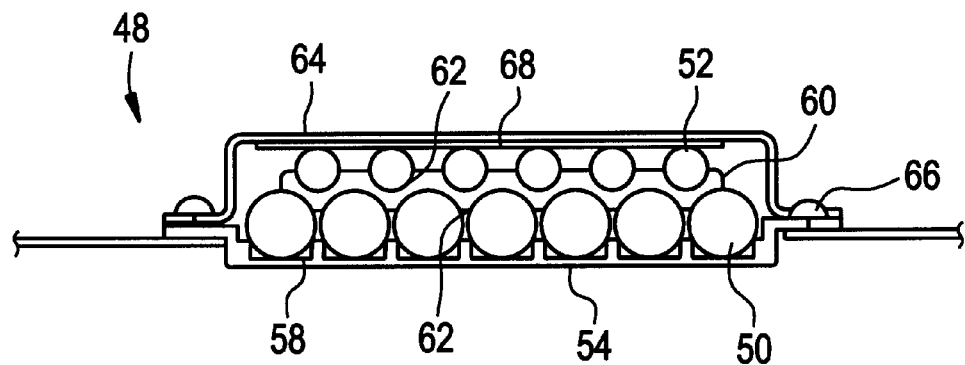
FIG. 11 is a front view of a second embodiment of a ganged component box according to the present invention.

FIGS. 10 and 11 show, respectively, top and front views of a first embodiment of a ganged component box 48 according to the present invention. The depicted component box 48 holds two layers of cylindrical optical components 10, a bottom layer 50 of 7 optical components 10 with a diameter of 5.5 mm, and a top layer 52 of 6 optical components with a diameter of 3.5 mm. It will be appreciated that it would be possible to vary the number, size, and shape of the components 10, as well as the number of layers, without departing from the sprit of the present invention.

In the present embodiment, the box 48 comprises a base 54 that is fastened to a printed circuit board 76 or other supporting structure using screws 56, although other fastening techniques may be used, as desired. The base includes a number of slots 58, which have a depth and width that are chosen such that when cylindrical components 10 are loaded into the slots 58, the slots 58 hold the components 10 in place, proximate to, and substantially parallel with, each other. Once the bottom layer 50 of components 10 are positioned in the slots 58, a spacer 60 is placed on top of the bottom layer 50 of components 10, in preparation for the positioning of the upper layer 58 of components 10. In an embodiment of the invention having only a single layer of optical components 10, this spacer 60 would, of course, not be necessary.

The spacer 60 includes a number of cradles 62 on its upper and lower surfaces which are shaped to closely conform to the profiles of the cylindrical optical components 10 being held in place. The spacer 60 may be machined metal or, alternatively, may be made from a compliant material, such as foam or silicone. After the lower layer of components 50 has been laid into the slots 58 in the base of the component box 48, the spacer 60 is then placed on top of the lower layer of components 50, such that the cradles 62 fit over the lower layer of components 50. The upper layer of components 52 is then laid into the cradles 62 on the upper surface of the spacer t 60.

After the components have been positioned, a clamping bar 64 is then positioned over the upper layer of optical components 52 and attached to the base 54 by screws 66 at either end. In an alternative embodiment, one side of the clamping bar 64 can be attached to the base 54 using a hinging arrangement. As shown in FIGS. 10 and 11, the clamping bar 64 is relatively narrow in width, covering only one end of the two layers of optical components 50, 52. It has been determined that this relatively narrow clamping bar 64 provides acceptably secure clamping, while allowing most of each optical component to remain exposed. This exposure can be useful; for example, it allows information printed on the side of each component to remain visible. In the present embodiment, the spacer element 60 has a width such that it fits entirely under the clamping bar 64. In the present embodiment, the clamping bar 64 includes a thin foam layer 68 attached to its underside to provide cushioning for the upper layer of optical components 52. The fiber-optic leads from both the upper and lower layers 50, 52 of optical components extend out of either end of the component 48 box for splicing. One possible splicing arrangement that can be used with the component box shown in FIGS. 10 and 11 is shown in FIG. 18 and discussed below.

The component box shown in FIGS. 10 and 11 occupies an area of 2377.79 mm$^2$ for 13 components. This provides an area savings of approximately 1319 mm$^2$ when compared with the bay arrangement described above.

Figure 12:
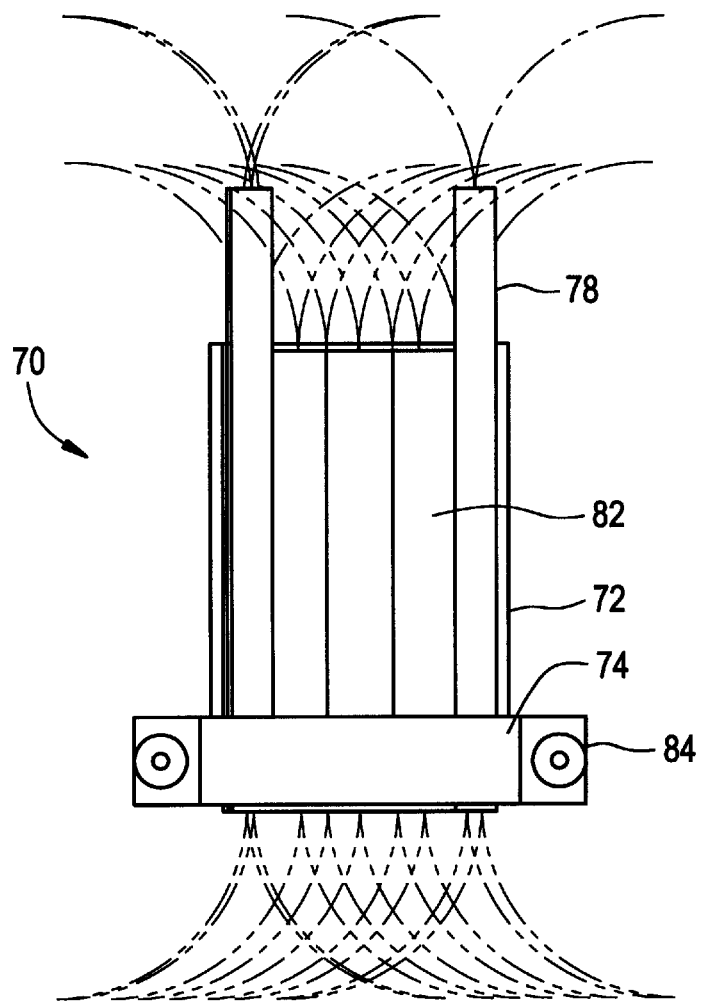
FIG. 12 is a top view of a second embodiment of a ganged component box according to the present invention.
Figure 13:
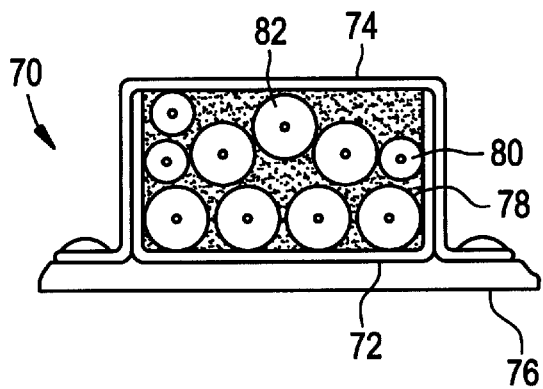
FIG. 13 is a front view of a second embodiment of a ganged component box according to the present invention.

FIGS. 12 and 13 show, respectively, top and front views of a second embodiment of a ganged component box 48 according to the present invention. In this embodiment, the base 72 and cover 74 are machined, respectively, from aluminum and stainless steel. The base 72 has a U-shaped profile, with a flat bottom surface that rests against the printed circuit board 76.

The use of the component box 48 shown in FIGS. 12 and 13 is similar to the box shown in FIGS. 10 and 11. A first layer of components 78 is laid into the bottom 72 of the box 72. If desired, a layer of "sticky" polyurethane can be affixed to the bottom of the box 72 before the first layer of optical components is laid into position. This layer of polyurethane can be useful in preventing undesirable movement of the components before the upper layers of components and foam strips have been clamped into place by a clamping bar 74. Conformal material 80, exemplary of which are foams and elastomers, is then used to separate the layers of optical components from each other. The conformal material 80 can take a number of forms, as desired. In one embodiment, foam strips are used. These strips are molded to include cradles # shaped to receive optical components 10, similar to the cradles shown in the spacer element 60 shown in FIG. 11. When all the layers of optical components and foam strips have been laid into position, the clamping bar 74 is attached using screws 84, or other fasteners.

Foam has a number of desirable features. It allows the material surroundings the optical components 10 to be compressed sufficiently for holding purposes. As an added benefit, the proper foam material provides a certain amount of friction to help in holding the components. The major benefit of the foam is that it allows addition and subtraction of components with only an adjustment in the quantity of foam. The area required by the component box shown in FIGS. 12 and 13 is 1869 mm$^2$, providing a space savings of 1828 mm$^2$ over the bay arrangement described above.

Figure 14:
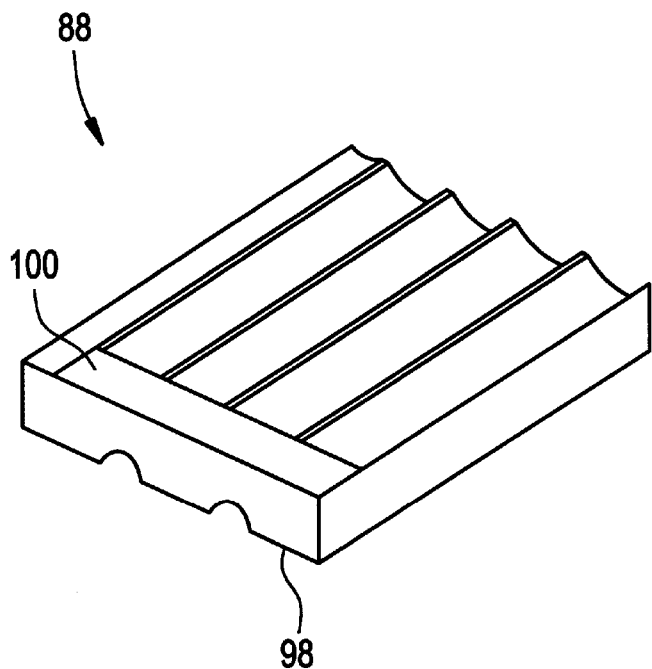
FIG. 14 is a perspective view of a bottom conformal component retaining pad according to the present invention.
Figure 15:
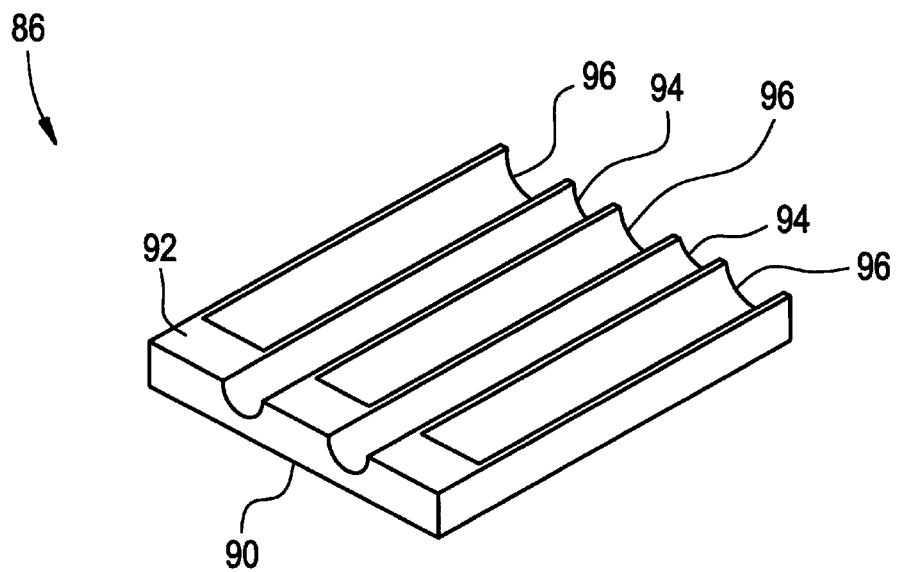
FIG. 15 is a perspective view of a top conformal component retaining pad according to the present invention.
Figure 16:
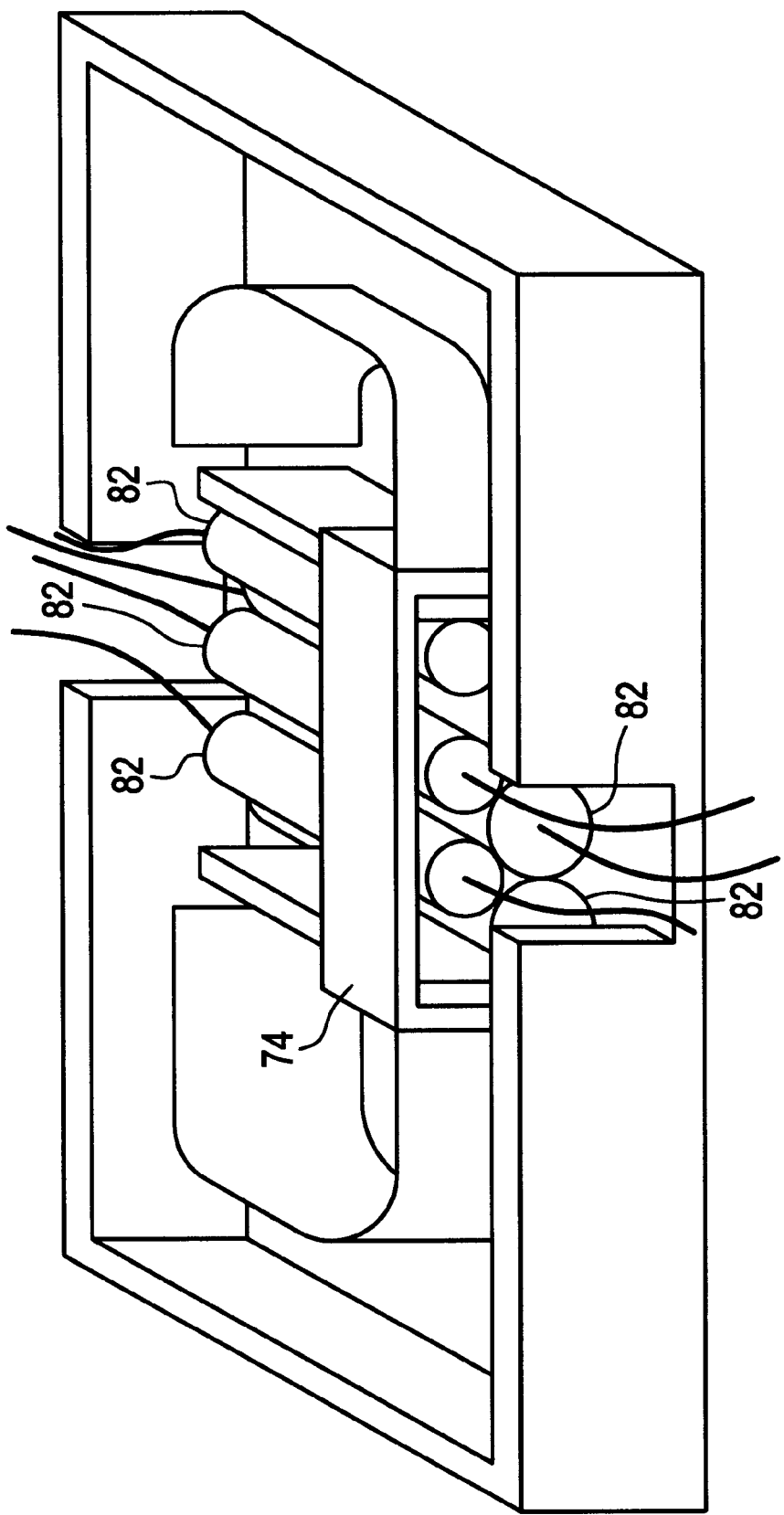
FIG. 16 is a perspective view of a fiber-optic device including a ganged component box according to the present invention.

FIGS. 14 and 15 show perspective views of conformal component retaining pads 86, 88 that, in a further embodiment of the present invention, are used to separate layers of optical components within a component box 48. In a present embodiment, the conformal component retaining pads 86, 88 are fabricated from silicone or any other suitably compliant material with a high compression setpoint. The first pad 86, includes a flat bottom surface 90, which rests on the floor of the component box 48. The upper surface 92 of the retaining pad includes a number of integrally formed cradles 94, 96, which are shaped to receive optical components 10. Two of the cradles 94 are shaped to receive smaller diameter (3.5 mm) cylindrical components, such as the one shown in FIG. 3, and the other three cradles 96 are shaped to receive larger diameter (5.5 mm) cylindrical components 10$d$,. The second pad #, has cradles # on both its lower surface 98 and its upper surface 100. The cradles on the lower surface 98 of the second pad 88 correspond in position to the cradles on the upper surface 92 of the first pad 86.

In use, the first retaining pad 86 is placed onto the base of a component box 48,. Optical components 10 are then laid into the receiving cradles, and the second retaining pad 88 is laid on top on the first layer 50 of components. A second layer of components 52 is laid on top of the second retaining pad 88. The cover plate, or clamping bar 64, is then placed on top of the second layer 52 of components and screwed into place. In this embodiment, a layer of silicone or other compliant material is affixed to the underside of the clamping bar to protect the optical components to insure that the optical components are held securely in place. It would also be within the spirit of the present invention to provide a third conformal component retaining pad (not shown) to cover the top layer 52 of components prior to the attachment of the clamping bar 64.

FIG. 14 shows a perspective view of an optical amplifier module 102 including a ganged component box 48 according to the present invention. The optical components are all stored together in the box 48, with their optical fiber leads 14 extending out of either end. The leads are then measured, trimmed and spliced together, the resulting loops of optical fiber are then stowed by winding them around a "racetrack" portion 108 of the device's interior.

FIG. 15 shows a method 110 according to the present invention for holding optical components in a fiber-optic device. In this method, the optical components are loaded into a ganged component in a series of production stages. In step 112, a base such as the is mounted to a fiber-optic device,. In step 114, a first conformal component retaining pad, is loaded into a base. In step 116, any optical components to be loaded onto the upper surface of the first component retaining pad in this first manufacturing stage are laid into position. In step 118, a second conformal component retaining pad, is placed on top of the first conformal component retaining pad. In step 120, any optical components to be loaded onto the upper surface of the second component retaining pad in this first manufacturing stage are laid into position. In step 122, a clamping bar, is attached to the base over the conformal component retaining pads and optical components to hold them in place. In step 124, optical leads from the optical components are spliced together. In step 126, any resulting loops of fibers are stowed in a racetrack within the optical device,. In step 128, subsequent production stages, in which additional optical components are added into the component box, are accomplished by repeating steps 116 through 126 in as many production stages as desired until the optical components have been fully loaded into the component box.

It will be appreciated that the above method can be readily modified, as desired, to accommodate other bases, spacers, fiber-optic devices, etc. It should be noted that the number of layers of optical components, as well as the number of conformal component retaining pads or spacers can be modified as well. Also, of course, if desired, all of the optical components can be loaded into the component box in a single step.

It will be apparent to those skilled in the art that various modifications and variations can be made in the present invention without departing from the spirit and scope of the present invention. Thus, it is intended that the present patent cover the modifications and variations of this invention, provided that they come within the scope of the appended claims and their equivalents.

What is claimed is:

1. A method for holding optical components in a fiber-optic device, comprising the steps of:
   (a) positioning a first conformal component retaining pad on the upper surface of a base, said first conformal component retaining pad having an upper surface for receiving a first plurality of optical components;
   (b) positioning said first plurality of optical components on said upper surface of said first conformal component retaining pad;
   (c) placing a second conformal component retaining pad on top of said first plurality of optical components, said second conformal component retaining pad having a bottom surface shaped to fit over said first plurality of optical components, and an upper surface configured for receiving a second plurality of optical components;
   (d) positioning a second plurality of optical components on said upper surface of said second conformal component retaining pad;
   (e) attaching a clamping bar to said base such that said first conformal component retaining pad, said first plurality of components, said second component retaining pad, and said second plurality of components are held in place by clamping forces, with optical component fiber leads extending outside of opposite ends of the box for splicing;
   (f) splicing optical leads extending from the optical components; and
   (g) stowing the resulting loops of optical fiber.

2. A method for holding optical components in a fiber-optic device, comprising the steps of:
   (a) positioning a conformal component retaining pad fitting on an upper surface of a base, said conformal component retaining pad having an upper surface for receiving a plurality of optical components;
   (b) positioning at least one optical component on said upper surface of the conformal component retaining pad, wherein said at least one optical component has optical fiber leads that extend beyond of the base;
   (c) attaching a clamping bar to said base such that said conformal component retaining pad and said at least one optical components positioned on said conformal component retaining pad are clamped in place;
   (d) splicing said optical fiber leads;
   (e) removing said clamping bar;
   (f) Repeating steps (b) through (e) to install additional optical components.

* * * * *